Dec. 2, 1952  A. H. FRISCH  2,619,867
METHOD OF AND APPARATUS FOR COMPOSING HARMONIC CONTINUITIES
Filed July 6, 1950
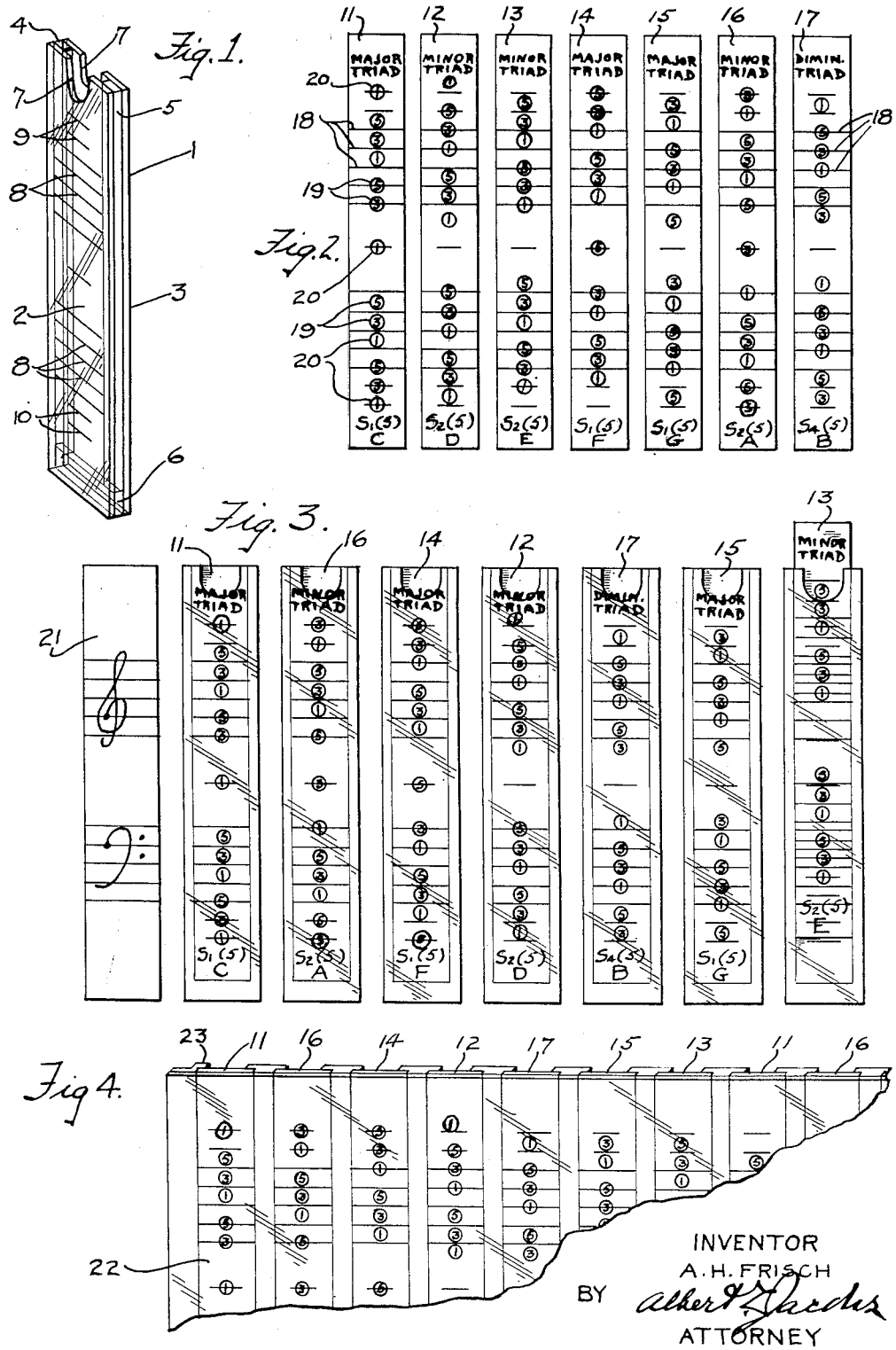
INVENTOR
A. H. FRISCH
BY Albert Jacobs
ATTORNEY Patented Dec. 2, 1952

2,619,867

UNITED STATES PATENT OFFICE 2,619,867

METHOD OF AND APPARATUS FOR COMPOSING HARMONIC CONTINUITIES

Abraham Herman Frisch, New York, N. Y.

Application July 6, 1950, Serial No. 172,263

12 Claims. (Cl. 84—475)

This invention relates to musical composition and particularly to the art of composing harmonic continuities.

One of the objects of the invention is to provide a method of composing harmonic continuities and a method of teaching the theories involved therein.

Another object of the invention is to provide manually operable apparatus for illustrating the traditional theories of root progression, chord structure, distribution of voices in chord positions, and patterns arising in voice leading in successive chords.

Still another object of the invention is to provide manually operable apparatus for illustrating the theories of harmonic continuities expounded in Volume I, Book V of The Schillinger System of Musical Composition, Including Theories, by Joseph Schillinger, published by Carl Fischer Inc., New York.

In this book chords are said to be an arrangement of notes, which are notes of one of 36 different diatonic (seven letter) scales, architecturally constructed upon roots, irrespective of scale. The notes which may be used for a chord based on a particular root are determined by the available chord functions (called "sigma"), and these, according to the Schillinger theory, are steps of alternate letters in a selected diatonic scale beginning with the root. Thus, the available chord functions of the root C, in the scale of C natural major covering two octaves, would be C, E, G, B, D, F, A, C. Following the Schillinger theories, these chord functions have been identified, according to this invention, by numbers determined by their distance in letter intervals from the root, the root being numbered 1. Thus, the numbers of the chord-function sequence just given would be 1 (the root), 3, 5, 7, 9, 11, 13, 1.

One manner of attaining the objects of the invention and utilizing these chord functions to aid in the composition of harmonic continuities is illustrated in the accompanying drawings, in which:

Figure 1 is a persepctive view of a transparent envelope used in connection with the invention;

Figure 2 is a plan view of a selected group of cards used to give the available chord functions in chords with the widest interval of five letters in the scale of C natural major;

Figure 3 is a plan view of a plurality of the envelopes of Figure 1 with the cards of Figure 2 inserted therein; and Figure 4 is a perspective view of a modified form of the apparatus.

In carrying out the invention I provide a plurality of transparent envelopes 1, suitably shaped so that each can be made to represent a section of the musical staff. Thus, the envolpes are relatively long and narrow and are preferably made of sufficiently heavy plastic material so that they will lie flat upon a table or may be propped up upon the music rack of a piano where they can be moved around and arranged in various ways without danger of being disarranged inadvertently when a desired sequence has been determined. The envelopes may be made, for instance, of plastic sheets 2 and 3 about $\frac{1}{16}$ of an inch in thickness, held in spaced relation at their side edges by strips 4 and 5 of similar thickness and with a strip 6 closing one end, the strips being cemented between the spaced sheets. The other end of the envelope is left open and the sheets 2 and 3 at that end are cut away forming rounded notches 7 which are used to facilitate the removal by the fingers of a card placed within the envelope.

Each envelope is provided with lines 8 arranged transversely of the envelope to represent the lines and spaces of the musical staff, and in addition short lines (ledger lines) 9 and 10 are provided at the top and bottom to define two spaces above and below the treble and bass clefs, respectively. Middle C is represented by the line between the two parts of the staff. The lines are provided on at least one side of the envelope, as, for instance, on the sheet 2, although I preferably provide them on both sides, and the lines are printed, engraved, or otherwise applied in a permanent fashion so that they cannot be rubbed off in use.

A plurality of cards of the proper size and thickness to fit within the envelopes 1 are provided to give the available chord structures for the various roots. There are twenty-one roots, representing the first seven letters of the alphabet which are the seven notes of the diatonic scale, with their sharps and flats. However, I provide at least twenty-eight cards for each root because of the necessary different arrangements of chord structures based on each root. It is not believed necessary to illustrate or explain all of these in the present application, since they are all included in the publication referred to above.

Not all of the chord functions, 1, 3, 5, 7, 9, 11, and 13 are used at the same time. The chord structures on any one root may consist of three or more chordal functions. The choice of chordal functions depends on the number of voice parts participating in the harmonic continuity. Following the Schillinger theories, in four part harmonic continuities, those chord structures having the functions 1, 3, and 5 are denoted by the figure "5"; those having functions 1, 3, 5, and 7 are denoted by the figure "7"; those having functions 1, 3, 7, and 9 by the figure "9"; those having the functions 1, 7, 9, and 11, by the figure "11"; and those having functions 1 and 13 with varying intermediate chordal functions by the figure "13." The letter "S" is used to denote a chord structure. There are four kinds of "S(5)" chords. These are major, minor, augmented, and diminished, and I represent them respectively by these names and by the designations "$S_1$," "$S_2$," "$S_3$," and "$S_4$." There are at least seven S(7) chords, seven S(9) chords, eight S(11) chords and some S(13) chords. All are labeled according to the Schillinger theories set forth in the publication referred to above.

In the drawings I have shown a set of the root cards 11 to 17, for the scale of C natural major, representing, respectively, root letters C, D, E, F, G, A, B with chord-structure designation "S(5)" applied to them and also bearing the traditional label of triads. These cards are also provided with transverse lines 18, representing the lines of the staff, and these lines are placed on the cards so that they will align with the lines 8 on the envelopes when the cards are inserted in the envelopes, as shown in Figure 3. Also each card has printed on it in four octaves the available chord functions for the chord structure in circles 19 and 20, representing notes, the circles 20 representing the root numbers preferably being in a different color or provided with some other distinguishing characteristic, so that the chord functions representing the roots may be seen at a glance.

It will be seen that the cards for the root letters C, F, and G are labeled "$S_1(5)$." This is because chords using the functions 1, 3, and 5, based on these letters are major triads in the scale of C natural major. Cards for the roots D, E, and A, however, are labeled "$S_2(5)$." This is because chords using functions 1, 3, and 5, based on these letters are minor triads in the scale of C natural major. Also the card for the root letter B is labeled "$S_4(5)$." This is because the chord using the functions 1, 3, and 5, based on this letter is a diminished triad in the scale of C natural major.

Having selected the cards, giving due consideration to sequence of roots (root progression) and chord structures, as above noted, the procedure for composing harmonic continuities is as follows: The cards are inserted in the transparent envelopes 1, which are then arranged side-by-side in accordance with a predetermined progression of roots. The progression of roots may take a number of forms, as explained in the publication above referred to, including diatonic scales, and scales based on various symmetric divisions of the octave. A simple form of root progression is called the "Harmony Scale, Zero Expansion," which is written: H S $E_0$ and consists of alternate letters of the scale expanded through two octaves and rotated and played backwards, thus in the scale of C natural major: C, A, F, D, B, G, E, and C. The cards are shown in Figure 3 arranged in accordance with this form of root progression.

When the envelopes are thus arranged, the first two problems of root progression and chord structure have been met and the next step is to select the octave position of the four voice parts in the first chord. It will be noted that the chord structures on the cards appear in four octaves and in the S(5) structures have three functions each. Since there are four voice parts, soprano, alto, tenor, and bass, it is necessary to double or repeat at least one of the notes of the S(5) chord to have a note for each voice part. In the simplest form, the root, or the number 1 function, is doubled. Four notes are then written directly on the envelope on any of the lines or spaces occupied by the available chord-function numbers, one note for each part. For this purpose I prefer to use some kind of writing medium which can be easily removed. If the envelopes are made of plastic, a soft crayon will be found to give good results, since the marks made by it can be quickly wiped off with a paper handkerchief or even with the finger.

Having established octave positions of the voice parts in the first chord it is necessary to decide on the manner of selecting the octave position of the available chord functions for the four voice parts in the next chord. The way the note of each part in a chord moves to the next chord is called "voice leading" and a certain voice leading pattern is determined in advance. This pattern may be in the form of a cycle, said to be in a clockwise direction, going from 1 to 3 to 5 to 1, or in a counter-clockwise direction, going from 1 to 5 to 3 to 1, or various other more involved patterns may be used. In other words, if the note in one chord corresponding to one voice part is on the chord function 5, then it will shift to 1 in the next chord, if the first-mentioned simple, clockwise cycle is followed. The notes in all the other parts will similarly shift to the next note in the same cycle. This procedure is followed until all the desired chords have been completed. The pattern of voice leading may be changed at any point in the sequence.

When all the four part chords have been drawn upon the envelopes, the cards are removed from the envelopes without disturbing the order of the envelopes. Thus the chords will stand alone without the chord function numbers.

If desired, cards may be provided with key signatures on them so that the proper key signature may be placed at the left of the series of envelopes for the purpose of further guiding the composer. Such a card, indicated at 21, is shown in Figure 3.

I have stated that I prefer to have both faces 2 and 3 of the envelopes transparent and provided with the staff lines. When this is done, the composer may, instead of completely removing the cards from the envelopes, remove them, turn them over, and then reinsert them. He may then check back on his procedure simply by turning an envelope over when the chord-function numbers will appear again through the other transparent face of the envelope.

From the above description it will be seen that by using the apparatus of the invention the composition of harmonic continuities can be readily carried out following the Schillinger theories or, disregarding the Schillinger theories by traditional techniques of harmonic continuities. The relatively heavy envelopes may be moved around at will and the various cards manipulated so that great flexibility is obtained. Alternative chords may be applied to additional envelopes, so that envelopes can be interchanged and the chords sounded until the desired effect is obtained.

While the individual envelopes are preferred, I may in some instances dispense with them and provide a single sheet 22 of transparent material, as shown in Figure 4, and place the cards under it. Suitable guides, such as the flanges 23, may be provided on the rear surface to receive the cards so that they will stay in position when placed under the sheet.

An important feature of the invention is the use of the apparatus for teaching the traditional theories of root progression, chord structure, distribution of voices in chord positions, and patterns arising in voice leading in successive chords. By arranging and re-arranging the cards and envelopes, the student is able quickly to visualize and understand the principles involved.

While the invention has been shown and described in connection with one embodiment, I do not wish to limit myself except by the limitations contained in the appended claims.

What I desire to claim and secure by Letters Patent is:

I claim:

1. Apparatus for use in composing, visualizing and recording harmonic continuities and teaching composition of harmonic continuities comprising a plurality of elongated cards, each card bearing the lines of the musical staff crosswise thereof, so that the whole card forms a section of a musical staff, each card also bearing a root and a chord structure designation and chord-function designations based on the particular root independent of scale, and transparent means bearing the lines of the musical staff and adapted to be placed over a row of said cards with the staff lines on the said cards aligned with the lines on said transparent means, whereby notes may be drawn on said transparent means using said chord-function designations as guides.

2. Apparatus, as defined in claim 1, in which the transparent means comprises individual transparent envelopes for the cards, the cards and envelopes being substantially coextensive.

3. Apparatus, as defined in claim 2, in which the staff lines are placed on both sides of the envelopes.

4. Apparatus, as defined in claim 1, in which the transparent means comprises individual transparent envelopes for the cards, each envelope being made of heavy transparent material with the opening to receive the card at the end.

5. Apparatus, as defined in claim 4, in which the chord-function designations are number 1 for the root and numbers representing the number of letters in the scale between the root and the other particular chord function and including the root and the other function.

6. Apparatus, as defined in claim 5, in which the chord-function designations are odd numbers.

7. Apparatus, as defined in claim 1, in which the chord-function designations are number 1 for the root and numbers representing the number of letters in the scale between the root and the other particular function and including the root and other function.

8. Apparatus, as defined in claim 7, in which the chord-function designations are odd numbers.

9. Apparatus, as defined in claim 8, in which the cards are divided into twenty-one groups representing the first seven letters of the alphabet which are the seven notes of the diatonic scale with their sharps and flats and each group has sub-groups having chord functions with letter intervals for four part harmony of 1, 3, 5; 1, 3, 5, 7; 1, 3, 7, 9; 1, 7, 9, 11; and 1 and 13, with varying intermediate chordal functions.

10. Apparatus, as defined in claim 1, in which the cards are divided into twenty-one groups, representing the first seven letters of the alphabet which are the notes of the diatonic scale with their sharps and flats, and each group has sub-groups having chord functions with letter intervals for four part harmony of 1, 3, 5; 1, 3, 5, 7; 1, 3, 7, 9; 1, 7, 9, 11; and 1 and 13, with varying intermediate chordal functions.

11. Apparatus for composing harmonic continuities and teaching the composition thereof which comprises a set of related cards provided with transverse musical staff lines and transparent envelope means similarly provided, the said cards being insertable into and removable from said transparent envelope means and when inserted having their musical staff lines in registration with those of said envelope means, each such card being provided at its lower end with root and chord-structure designations and with chord-function designations based on the root designation, and a key signature card disposable at one side of said set of cards and provided with musical staff lines horizontally aligned with the card and envelope lines aforesaid, whereby notes in compositionally correct relationship may be marked on the transparent envelope means using said card set markings as guides.

12. Apparatus as defined by claim 11 in which the chord-structure has the functions 1, 3, 5 when the chord-structure represents major, minor, augmented and diminished triads.

ABRAHAM HERMAN FRISCH.

REFERENCES CITED

The following references are of record in the file of this patent:

UNITED STATES PATENTS

| Number | Name | Date |
|---|---|---|
| 1,354,214 | Robinson | Sept. 28, 1920 |
| 1,675,528 | Bishop | July 3, 1928 |
| 2,473,988 | Coleman | June 21, 1949 |

FOREIGN PATENTS

| Number | Country | Date |
|---|---|---|
| 336,647 | Great Britain | Oct. 13, 1930 |
| 904,875 | France | Mar. 19, 1945 |